United States Patent
McKinster et al.

(10) Patent No.: US 10,207,761 B2
(45) Date of Patent: Feb. 19, 2019

(54) FUEL TANK ASSEMBLY, MOTORCYCLE ACCESSORY, AND METHOD OF ATTACHMENT

(71) Applicant: Harley-Davidson Motor Company Group, LLC, Milwaukee, WI (US)

(72) Inventors: Scott McKinster, Watertown, WI (US); Stephen Perry, Colorado Springs, CO (US); Stephen Hebert, Franklin, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 242 days.

(21) Appl. No.: 15/163,013

(22) Filed: May 24, 2016

(65) Prior Publication Data

US 2017/0341697 A1 Nov. 30, 2017

(51) Int. Cl.
*B60R 13/00* (2006.01)
*B62J 35/00* (2006.01)
(Continued)

(52) U.S. Cl.
CPC ........... *B62J 35/00* (2013.01); *B60K 15/0406* (2013.01); *B60K 15/0409* (2013.01);
(Continued)

(58) Field of Classification Search
CPC ................... G09F 21/04; G09F 21/048; G09F 2007/1865; B60R 13/005; B60R 13/04;
(Continued)

(56) References Cited

U.S. PATENT DOCUMENTS 2,091,682 A * 8/1937 Harley ............... B62J 99/00
180/90
3,832,901 A * 9/1974 Girvin, III .............. G01F 23/02
116/227
(Continued)

FOREIGN PATENT DOCUMENTS

BE 1016168 4/2006
DE 102010037912 4/2012
(Continued)

OTHER PUBLICATIONS

Indian Motorcycles Threaded Faux Fuel Cap, Publicly available prior to May 24, 2016 (3 pages).

*Primary Examiner* — Anne Marie M Boehler
(74) *Attorney, Agent, or Firm* — Michael Best & Friedrich LLP

(57) ABSTRACT

A fuel tank assembly for a motorcycle. The fuel tank assembly includes a fuel tank defining a fuel containment volume. The fuel tank has an upper wall. A fuel cap is operable to selectively open and close the fuel containment volume. A motorcycle accessory is attachable to the fuel tank via a connection structure including first and second connection portions that are complementary and inter-engageable together to positively define a fully-secured state. The first connection portion is secured to an exterior surface of the upper wall of the fuel tank, and the second connection portion is secured to the motorcycle accessory. The connection structure defines a finite position and rotational orientation of the motorcycle accessory upon relative rotation of the motorcycle accessory with respect to the fuel tank to the fully secured state.

9 Claims, 6 Drawing Sheets

(51) Int. Cl.
  *B60K 15/04* (2006.01)
  *B60K 15/067* (2006.01)
  *B62J 9/00* (2006.01)
  *B62J 99/00* (2009.01)
  *B60K 15/03* (2006.01)

(52) U.S. Cl.
  CPC ............ *B60K 15/067* (2013.01); *B62J 9/008* (2013.01); *B60K 2015/03447* (2013.01); *B60K 2015/0451* (2013.01); *B60Y 2200/12* (2013.01); *B62J 2099/002* (2013.01); *B62J 2099/004* (2013.01); *B62J 2099/0006* (2013.01); *B62J 2099/0033* (2013.01); *B62J 2099/0086* (2013.01)

(58) Field of Classification Search
  CPC ... B62D 61/02; B62J 35/00; B62J 2099/0086; B62J 2099/033
  USPC ......... 180/219; 280/288.4, 835; 40/591, 1.5, 40/1.6, 643; 296/1.07; D12/108, 110, D12/114, 115
  See application file for complete search history.

(56) References Cited

U.S. PATENT DOCUMENTS 6,209,745 B1    4/2001   Jansson
6,974,059 B2   12/2005   Alderman
7,182,359 B2    2/2007   Galvagno
7,226,321 B2*   6/2007   Uhari ..................... G01D 11/24
                                                     439/752
7,469,947 B2*  12/2008   Yamaguchi ............. B62J 35/00
                                                     180/90
8,919,624 B2   12/2014   Visenzi
9,359,033 B2    6/2016   Okawasa et al.
2003/0042261 A1  3/2003  Cantor
2006/0118585 A1* 6/2006  Ognissanti .............. B62J 9/008
                                                     224/413
2007/0075087 A1* 4/2007  Knight ................... B05D 7/227
                                                     220/562
2007/0124972 A1* 6/2007  Ratcliffe ............... B60R 13/005
                                                     40/591
2009/0021038 A1* 1/2009  Ohzono .................. B62J 17/02
                                                     296/37.16
2014/0360893 A1* 12/2014 Whitten ................. A45C 11/00
                                                     206/45.2

FOREIGN PATENT DOCUMENTS

EP       1634802     3/2006
EP       1652761     5/2006
EP       2147850     1/2010
GB       2525196    10/2015

* cited by examiner

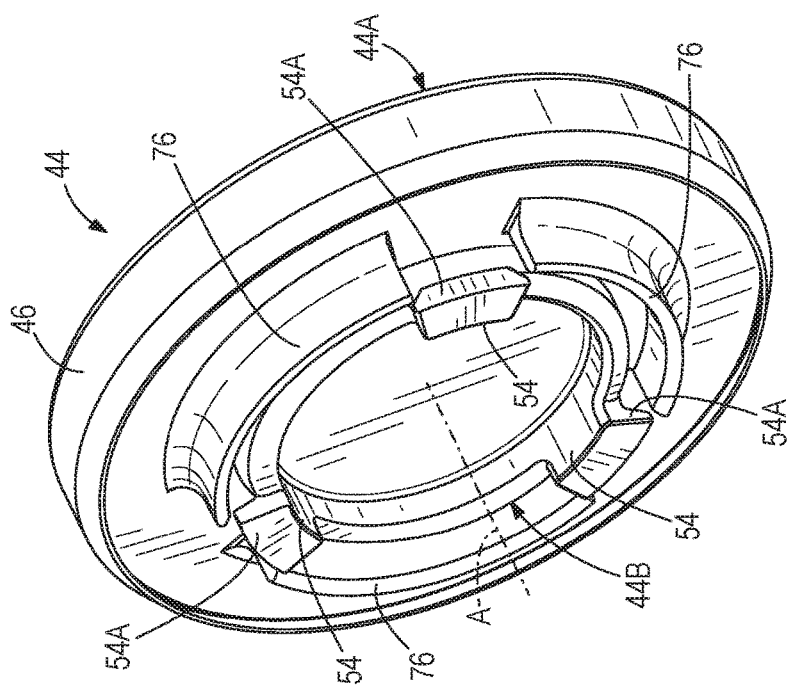
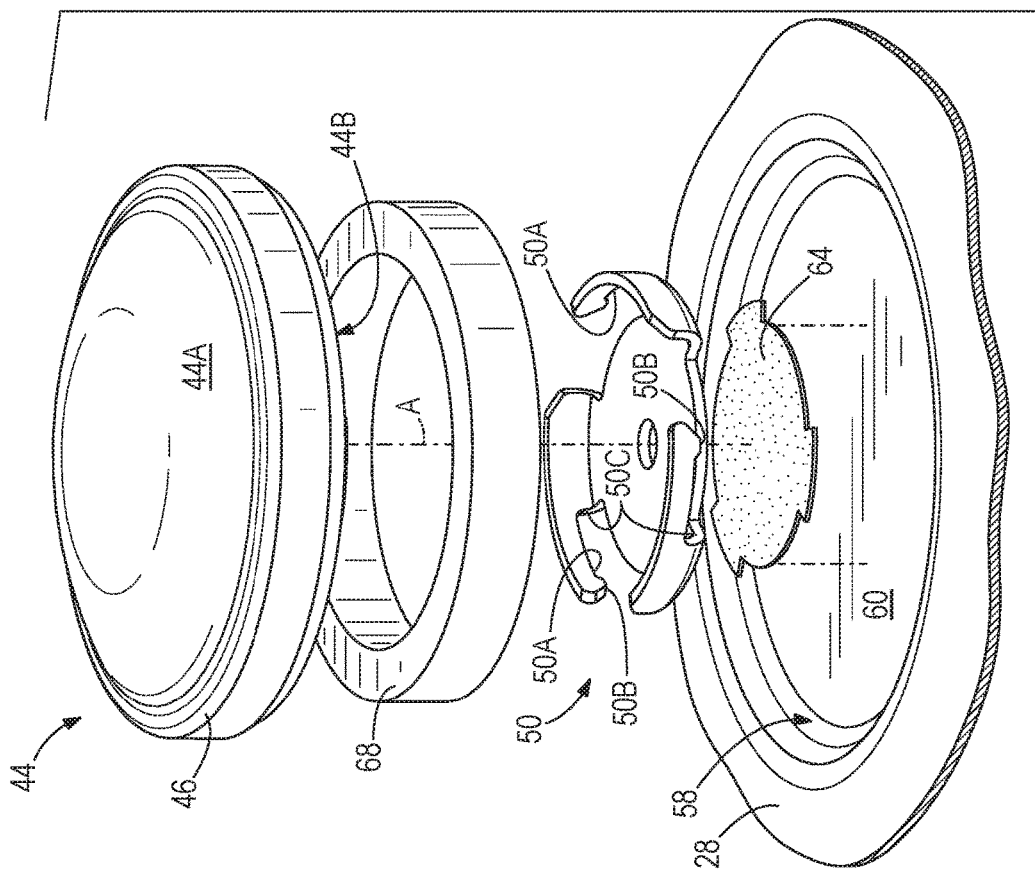

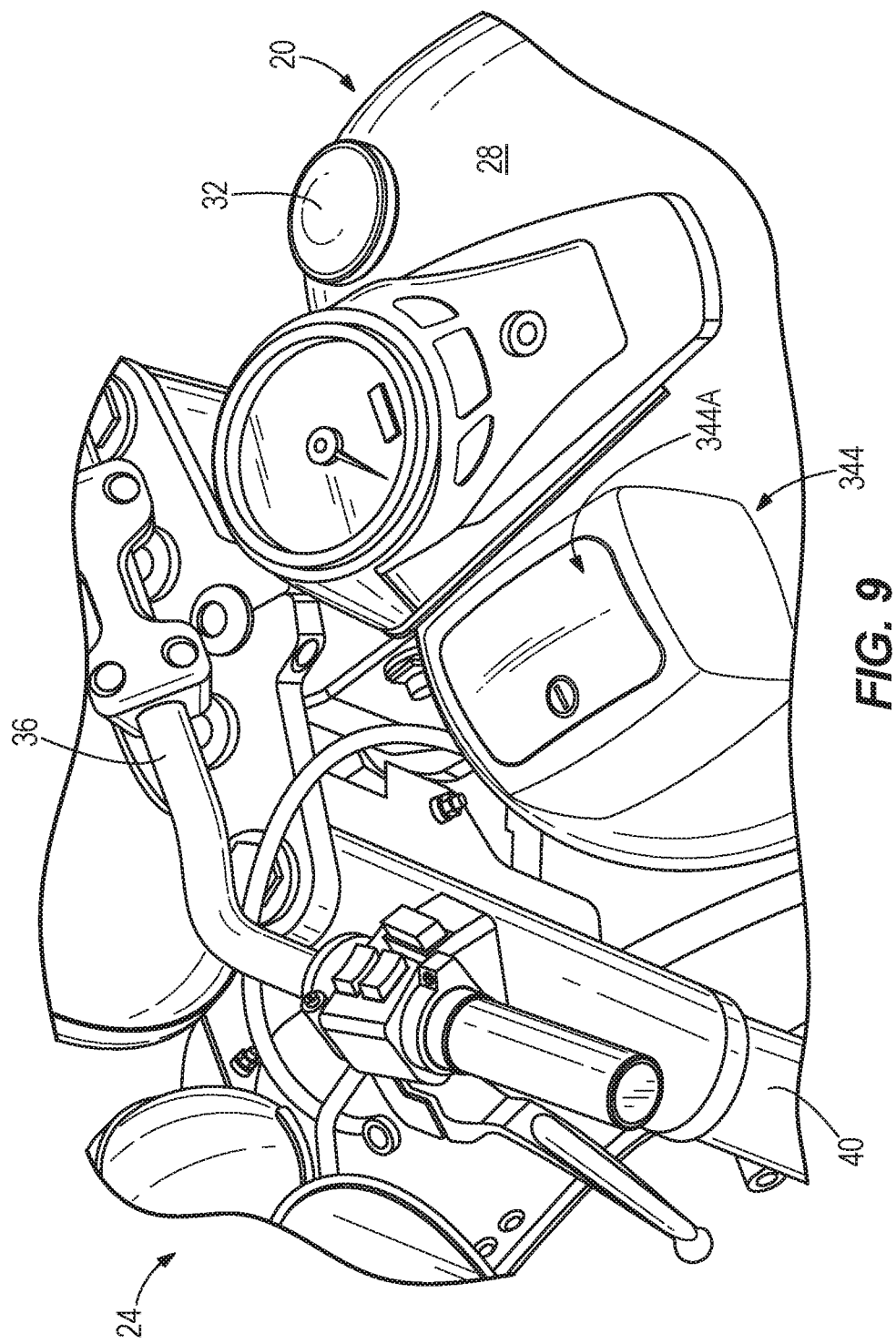

FUEL TANK ASSEMBLY, MOTORCYCLE ACCESSORY, AND METHOD OF ATTACHMENT

FIELD OF THE INVENTION

The present invention relates to motorcycles, and in particular, motorcycle fuel tanks and motorcycle accessories. The invention further relates to methods of attaching accessories to a motorcycle.

BACKGROUND OF THE INVENTION

Many motorcycles are provided with an exposed fuel tank that forms part of the exterior design characteristic of the motorcycle. A motorcycle fuel tank can be provided at its top surface with a fill aperture and a corresponding closure mechanism, or fuel cap. In some cases, the fuel cap is located centrally along a longitudinal centerline of the motorcycle, while in other cases, it is offset to one lateral side of the fuel tank. In some cases where the fuel cap is offset to one lateral side, another similar-looking component is provided on the opposite lateral side of the fuel tank to be symmetrical with the fuel cap. This component can be strictly decorative or can form part of a fuel gauge. Mounting this component requires at least one aperture through the upper wall of the fuel tank and/or providing mating screw threads for screwing the component to the fuel tank.

SUMMARY OF THE INVENTION

The invention provides, in one aspect, a fuel tank assembly for a motorcycle. The fuel tank assembly includes a fuel tank defining a fuel containment volume. The fuel tank has an upper wall. A fuel cap is operable to selectively open and close the fuel containment volume. A motorcycle accessory is attachable to the fuel tank via a connection structure including first and second connection portions that are complementary and inter-engageable together to positively define a fully-secured state. The first connection portion is secured to an exterior surface of the upper wall of the fuel tank, and the second connection portion is secured to the motorcycle accessory. The connection structure defines a finite position and rotational orientation of the motorcycle accessory upon relative rotation of the motorcycle accessory with respect to the fuel tank to the fully secured state.

The invention provides, in another aspect, a motorcycle accessory attachable to a motorcycle. The accessory includes an outer end provided with a surface for viewing and/or handling, and an inner end opposite the outer end. A connection portion is provided at the inner end for attachment to a complementary motorcycle connection portion. The connection portion of the motorcycle accessory defines an axis and includes three circumferentially-spaced locking tabs positioned at even intervals. Each of the locking tabs has a prong that extends radially with respect to the axis.

The invention provides, in another aspect, a method of attaching a motorcycle accessory to a motorcycle fuel tank. One of the motorcycle accessory and the motorcycle fuel tank is provided with a plurality of slots in a circumferentially-spaced arrangement, each of the slots extending in a circumferential direction. The other of the motorcycle accessory and the motorcycle fuel tank is provided with a plurality of locking tabs, the locking tabs being circumferentially-spaced apart from one another to complement the arrangement of the plurality of slots. The motorcycle accessory is moved along an axis toward the motorcycle fuel tank from a first axial position to a second axial position in which the plurality of locking tabs are aligned with the plurality of slots at a common position along the axis. A resilient member is compressed axially between the motorcycle accessory and the motorcycle fuel tank. The motorcycle accessory is rotated, while in the second axial position, through no more than 180 degrees about the axis into a positively-defined, fully-secured state.

BRIEF DESCRIPTION OF THE DRAWINGS

FIG. 3 is an exploded assembly view of the motorcycle fuel tank assembly of FIGS. 1 and 2.

FIG. 4 is a perspective view of an inner end of the motorcycle accessory, showing a connection structure thereof.

FIG. 9 is a perspective view of a motorcycle fuel tank assembly according to yet another construction, including a fuel tank-mounted accessory with a storage compartment.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
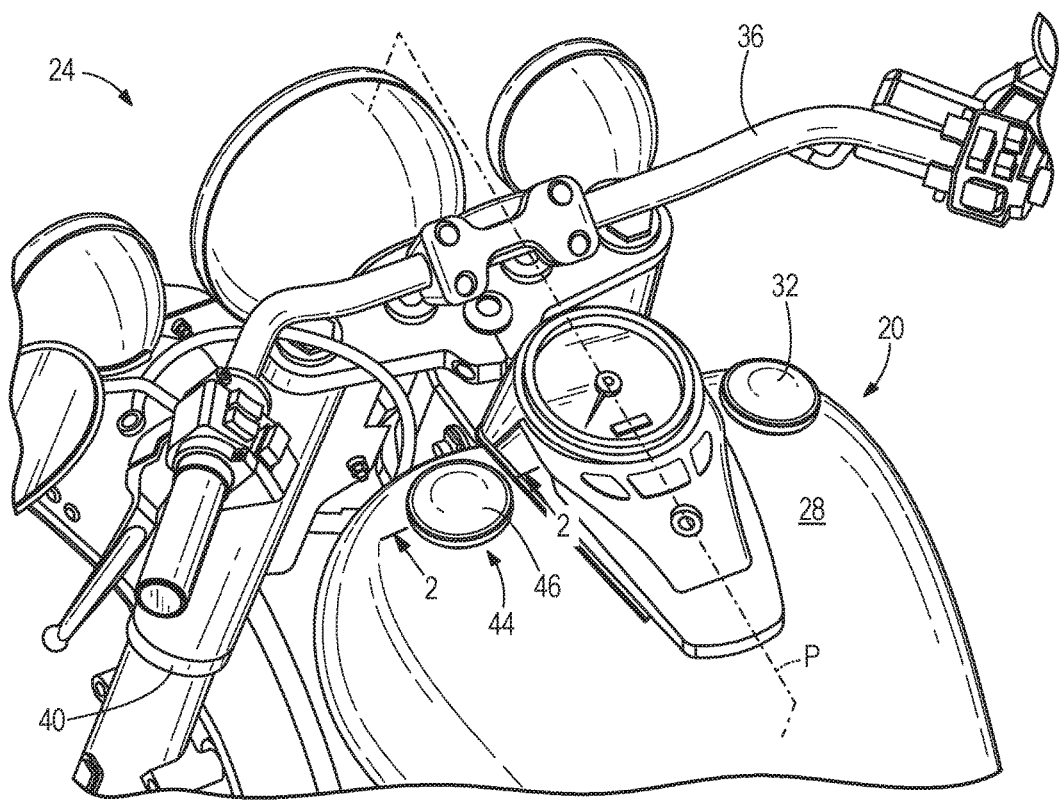
FIG. 1 is a perspective view of a motorcycle fuel tank assembly, including a fuel tank-mounted accessory, according to one construction.

FIG. 1 illustrates a fuel tank assembly including a fuel tank 20 and a fuel cap 32. The fuel tank 20 may be an exposed fuel tank provided on a saddle ride vehicle, referred to herein as motorcycle 24, to contain a quantity of fuel for supply to an engine (e.g., a gasoline-fueled internal combustion engine) which provides motive power during operation. As shown in FIG. 1, the motorcycle 24 includes an exposed cockpit and a handlebar 36 coupled to a front wheel fork 40. The fuel tank 20 includes a fuel inlet, or fill aperture, along an upper wall 28 of the fuel tank 20, and the inlet can be selectively opened or closed with the fuel cap 32, such as by threading, latching or other means. When the fuel inlet is closed by the fuel cap 32, the fuel cap 32 seals the fuel tank 20 to prevent the escape of fuel to the atmosphere. The fuel cap 32 can close off the containment volume of the fuel tank 20 during operation, and when the operator needs to refuel, the fuel cap 32 is removed to access the fuel tank 20 for adding fuel through the fuel inlet.

In addition to the fuel tank 20 and the fuel cap 32, the fuel tank assembly includes an accessory 44. The accessory 44 is positioned on an exterior surface of the upper wall 28 of the fuel tank 20, and can be provided at a position that mirrors the position of the fuel cap 32 across a longitudinal center plane P of the motorcycle 24. The longitudinal center plane P can be a symmetry plane defined by the shape of the fuel tank 20 and/or other parts of the motorcycle 24 such as the handlebar 36, a seat, etc. As shown, the accessory 44 can have an outward appearance that mimics that of the fuel cap 32, thus providing visual symmetry to the fuel tank assembly. For example, the accessory 44 can include a cover 46 having an outer shape matching an outer shape of the fuel cap 32. The accessory 44 can take a number of other forms, including certain examples set forth further below, among others. The accessory 44 includes opposing ends including an outer end 44A and an inner end 44B. The accessory 44 is configured to attach to the motorcycle 24 such that the outer end 44A is exposed and faces generally away from the motorcycle 24 (i.e., away from the fuel tank 20) and the inner end 44B faces generally toward the motorcycle 24 (i.e., toward the fuel tank 20). The outer end 44A of the accessory 44, which can be provided by the cover 46 or a surface thereof, provides a surface for viewing and/or handling.

Figure 2:
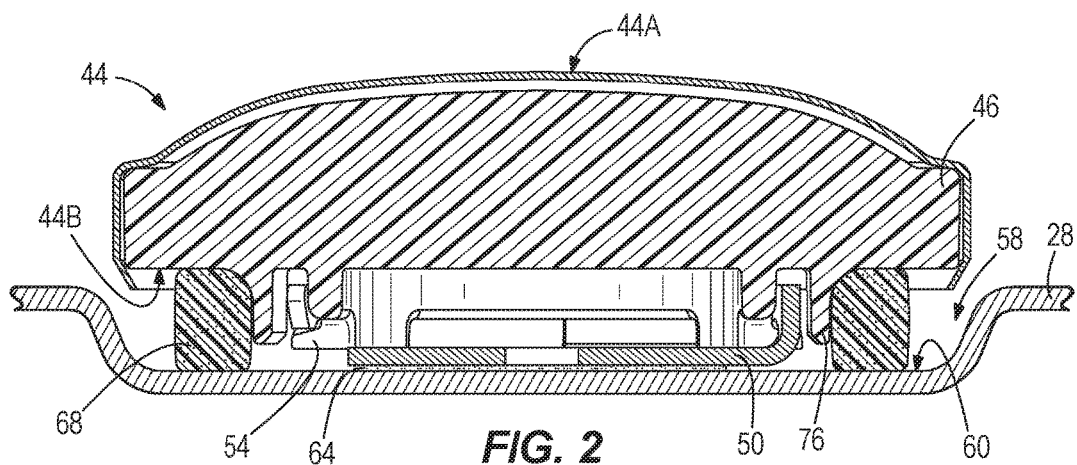
FIG. 2 is a cross-section view of the motorcycle fuel tank assembly taken along line 2-2 of FIG. 1.

Turning to FIGS. 2-4, the accessory 44 and the interface between the accessory 44 and the fuel tank 20 are shown in further detail. The accessory 44 is attachable to the fuel tank 20 via a connection structure including first and second connection portions 50, 54 that are complementary and inter-engageable together to positively define a fully-secured state. The first connection portion 50 is secured to the exterior surface of the upper wall 28 of the fuel tank 20, and the second connection portion 54 is secured to the accessory 44. The upper wall 28 of the fuel tank 20 can be formed with a depression or recess 58 including a recessed upper surface portion 60 spaced below the surrounding surface portions of the upper wall 28. The first connection portion 50 is secured to the upper wall 28 (e.g., to the recessed upper surface portion 60) without any penetrations through the upper wall 28. The first connection portion 50 is secured to the upper wall 28 by a bonded connection therebetween that can be a welded connection, a brazed connection, or an adhesive connection, for example. FIGS. 2 and 3 illustrate an adhesive layer 64 provided directly between the first connection portion 50 and the recessed upper surface portion 60. The adhesive layer 64 can be provided in a variety of forms such as a double-sided adhesive sheet or an epoxy resin.

The connection structure formed by the first and second connection portions 50, 54 is free of screw threads and defines a finite position and rotational orientation of the accessory 44 relative to the fuel tank 20 upon relative rotation of the accessory 44 with respect to the fuel tank 20 to the fully-secured state. In other words, at the point of being fully-secured, additional applied torque does not further tighten the first connection portion 50 to the second connection portion 54, and further relative rotation of the first and second connection portions 50, 54 may be physically blocked. As defined herein, positively defining a fully-secured state does not include a connection, such as a threaded connection, which becomes increasingly secured by additional tightening torque. Rather, positively defining a fully-secured state refers to the connection providing a predetermined, finite end to the coupling procedure. It is also noted that the connection structure for the accessory 44 enables the accessory 44 to achieve the fully-secured state with a total rotation relative to the fuel tank 20 of less than one full turn (i.e., 360 degrees of rotation), and in some cases one half turn (i.e., 180 degrees of rotation) or less. The connection structure may provide one or both of audible and tactile feedback as confirmation of positively achieving the fully-secured state.

The first and second connection portions 50, 54 can define a bayonet connection that positively defines the fully-secured state and does not rely on screw threads to make a connection. In the construction of FIGS. 2-4, the first connection portion 50 is provided as a locking plate having a plurality of bayonet slots 50A (e.g., three circumferentially-spaced bayonet slots arranged with even spacing about a central axis A). The second connection structure 54 is provided as a group of locking tabs equal in number to the plurality of bayonet slots 50A. Each of the locking tabs 54 includes a radially extending prong 54A (e.g., radially outward from the central axis A) sized to enter into and be retained in a corresponding one of the bayonet slots 50A. The prongs 54A extend radially outward away from the central axis A, which is a common axis of the connection structure when the first and second connection portions 50, 54 are coupled together. The second connection structure 54 can be provided integrally as a single piece with the accessory 44, or a portion thereof. For example, the cover 46 can be a one or two piece cover, one piece of which is integrally formed to include the locking tabs 54.

Each of the bayonet slots 50A has an entry portion 50B (FIG. 3) of reduced dimension (i.e., being narrowed compared to a majority of the slot 50A) adjacent an axially open section of the locking plate that allows the respective locking tab 54 to be aligned with the bayonet slot 50A by an axial movement of the accessory 44 toward the locking plate. Once joined axially, the first and second connection portions 50, 54 must undergo a relative rotation about the central axis A (e.g., a clockwise rotation of the accessory 44 relative to the fuel tank 20 as viewed from above in FIG. 1 or FIG. 3). During the relative rotation, each locking tab 54 traverses the restricted entry portion 50B and passes into the bayonet slot 50A. A leading portion of each locking tab 54 in the direction of rotation can abut an end portion 50C of the corresponding bayonet slot 50A to define the fully-secured state. This ensures the predictable orientation of the accessory 44 with respect to the fuel tank 20 and prevents the reliance on an increasing applied torque to achieve full securement. The abutment can provide one or both of tactile or audible feedback to the user. Once the locking tabs 54 reach the end portions 50C of the corresponding bayonet slots 50A, the first connection portion 50 of the accessory 44 cannot be further rotated or further tightened with respect to the second connection portion 54. Rotation into the fully-secured state may also include a trailing portion of each locking tab 54 traversing past the entry portion 50B of the corresponding bayonet slot 50A. A tactile and/or audible confirmation or "click" may occur as the entry portion 50B, which may deflect elastically during passage of the locking tab 54, snaps down over the trailing edge of the locking tab 54. The entry portion 50B may optionally be provided to positively block rotation of the accessory in a direction opposite the assembly rotational direction. In other constructions, the entry portion 50 is dimensioned to allow assembly and disassembly, but to hold the accessory from incidental detachment once fully secured.

To prevent unwanted noise and provide an axial preload when the first and second connection portions 50, 54 are coupled together, at least one resilient member 68 is provided. In the illustrated construction, the resilient member 68 is a ring of resilient material (e.g., rubber) arranged for compression between the upper wall 28 and the accessory 44 when the accessory 44 is in the fully-secured state. In other words, the resilient member 68 has a free height in the axial direction that is greater than an available axial space defined between the accessory 44 and the first connection portion 50. The resilient member 68 is illustrated in the form of a hollow cylinder with flat axial ends, but may take other forms such as a torus. An inner diameter of the resilient member 68 is larger than a diameter on which the bayonet slots 50A are arranged. The resilient member 68 is positioned radially outside the first and second connection portions 50, 54. The accessory 44 (e.g., the cover 46) can be provided with a cylindrical wall or cylindrical wall segments 76 for positively positioning the resilient member 68 with respect to the central axis A.

Figure 6:
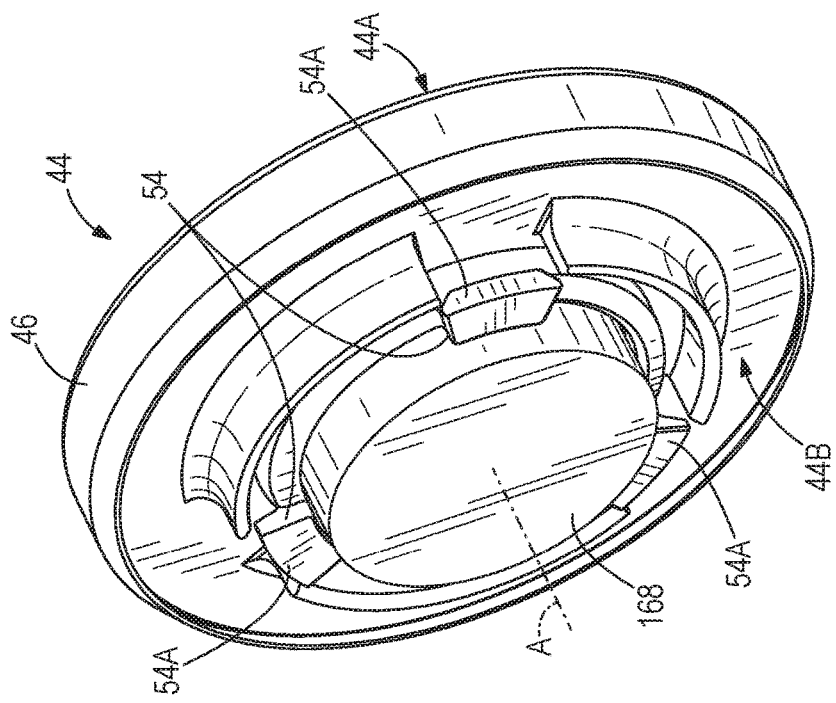
FIG. 6 is a perspective view of an inner end of the motorcycle accessory of FIG. 5, showing a connection structure thereof.
Figure 5:
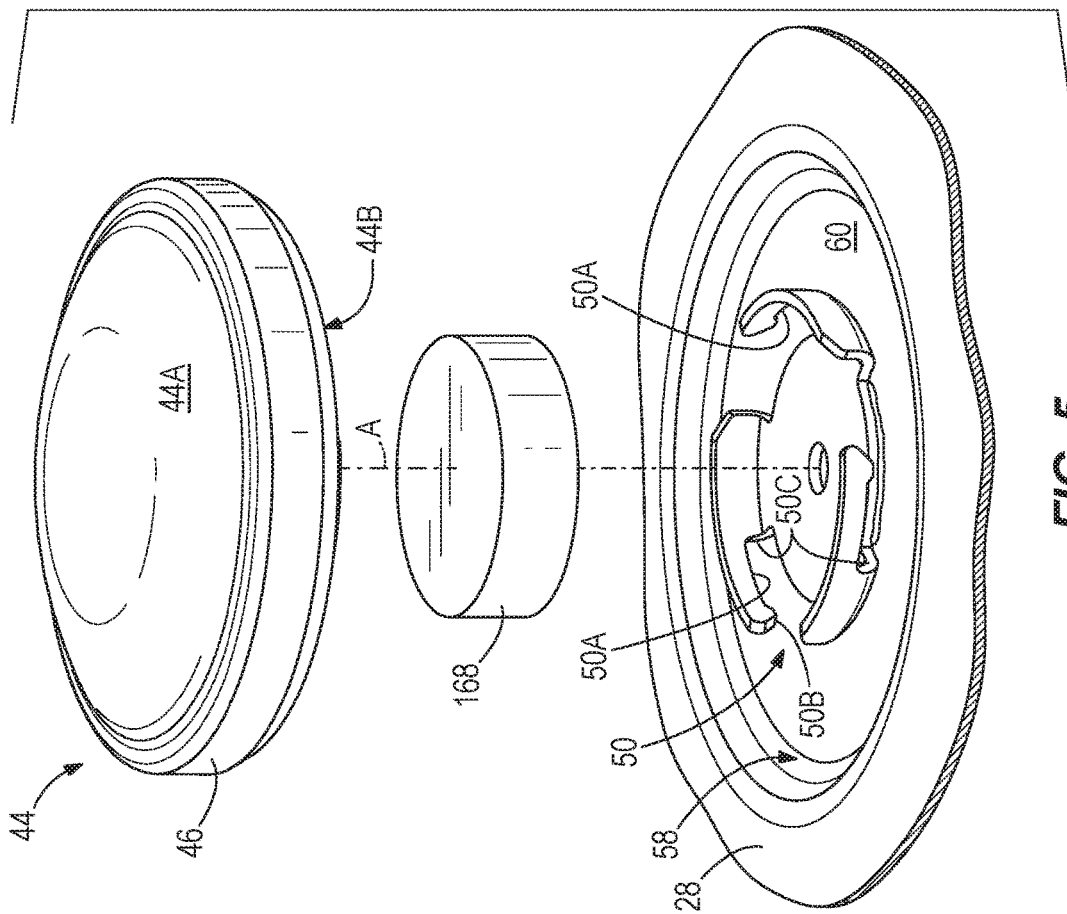
FIG. 5 is an exploded assembly view of a motorcycle fuel tank assembly according to another construction, showing a connection structure provided on an upper surface of the fuel tank.

FIGS. 5 and 6 illustrate features of an accessorized motorcycle fuel tank assembly according to another construction. Reference is made to the above description and FIGS. 1-4 for common features so as to avoid redundant description. Common reference numbers are applied as appropriate. Rather than being adhesively bonded to the fuel tank upper wall 28, the locking ring forming the first connection portion 50 of the accessory connection structure is secured directly to the exterior surface of the upper wall 28 by welding or brazing. The upper wall 28 and the locking ring can be formed of similar or dissimilar metals and bonded together with a filler material or directly fused together without a filler material. Another unique feature of the construction of FIGS. 5 and 6 is that the resilient member 168, otherwise similar to the resilient member 68 of FIGS. 2 and 3, takes an alternate form. The resilient member 168 of FIGS. 5 and 6 is positioned radially inward of the bayonet slots 50A and radially inward of the second connection portion 54 formed by the locking tabs with the radially extending prongs 54A. The resilient member 168 is in the form of a closed cylinder having an outer diameter less than a diameter on which the bayonet slots 50A are arranged. Although the welded or brazed structure (in lieu of the adhesive layer 64) and the use of a closed, inner-mounted resilient member 168 are illustrated in the context of one construction in FIGS. 5 and 6, it should be noted that either of these features may also be individually employed without the other, in combination with the features of any of the other constructions of the present disclosure.

Figure 7:
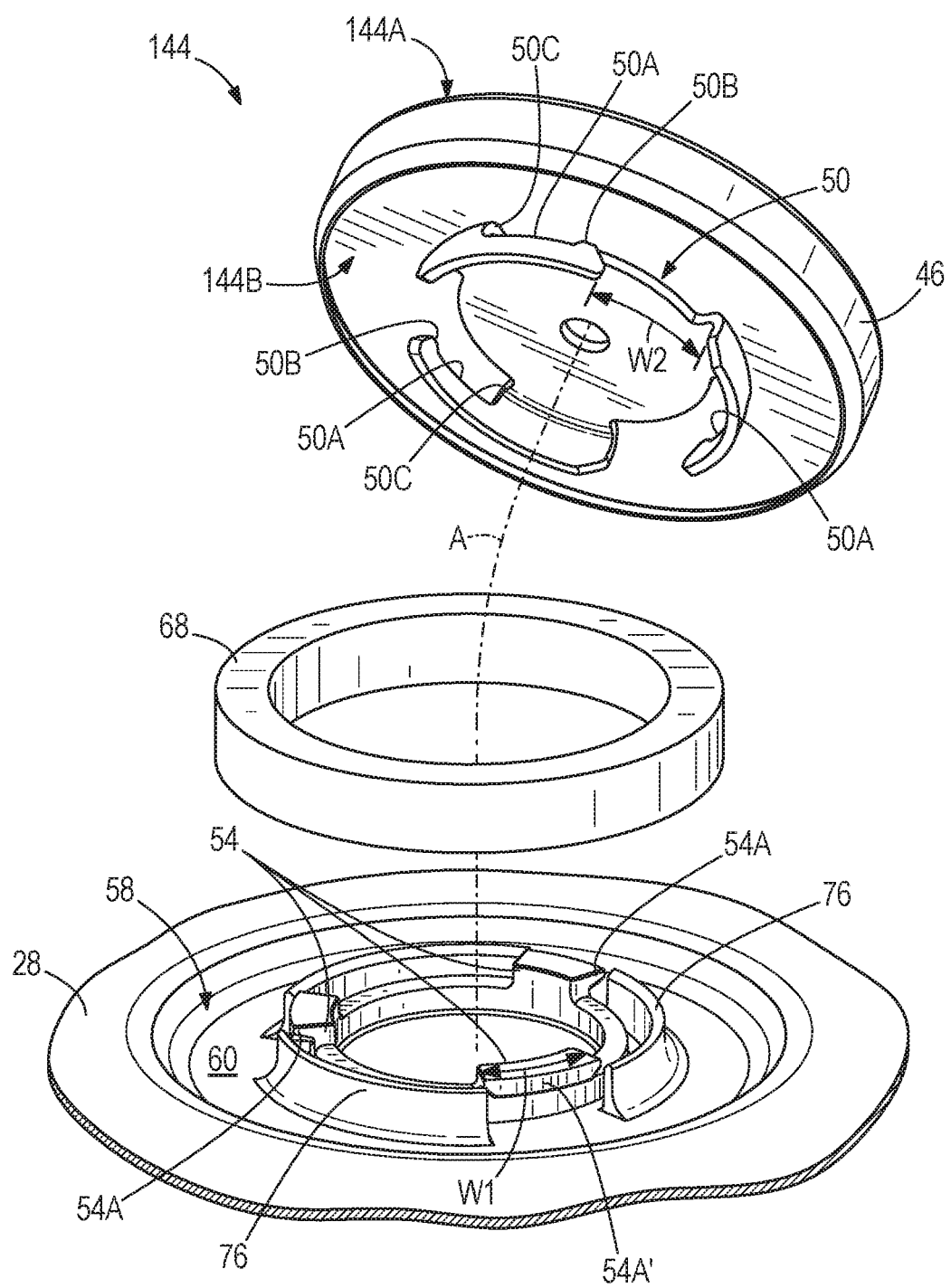
FIG. 7 is an exploded assembly view of a motorcycle fuel tank assembly according to yet another construction.

FIG. 7 is an exploded assembly view of yet another construction for securing an accessory 144 to the fuel tank 20. In this construction, the positions of the first and second connection portions 50, 54 are reversed from the positions described and illustrated with reference to FIGS. 2-6. As such, the connection portion 50 provided by the locking plate with the bayonet slots 50A is secured to the accessory 144 at an inner end 144B thereof, opposite an outer end 144A. Reference is made to the above description regarding the details of the connection portion 50 in order to avoid redundant description. The connection portion 54 provided by the plurality of locking tabs 54 with the radially extending prongs 54A is provided on the exterior surface of the upper wall 28 of the fuel tank 20 (e.g., on the recessed upper surface portion 60 within the recess 58). The prongs 54A extend radially outwardly, and cylindrical wall segments 76 are provided on the upper wall 28 for positively positioning the resilient member 68 with respect to the central axis A. Although the resilient member 68 can resemble that shown and described with respect to FIGS. 2 and 3, the resilient member 168 of FIGS. 5 and 6 can be used in other constructions. The connection portion 54 of FIG. 7 can be secured to the upper wall 28 of the fuel tank 20 in accordance with the above description of the manner for securing the first connection portion 50 with reference to FIGS. 2-6.

In some constructions the locking tabs 54 are integrally formed as a single piece with a ring or plate that is secured to the fuel tank upper wall 28, while in other constructions, the locking tabs 54 are individually formed and secured to the fuel tank upper wall 28. In some constructions, the cylindrical wall or cylindrical wall segments 76 can also be integrally formed as a single piece with the locking tabs 54.

Although each of the prongs 54A may be shaped identically to each other, FIG. 7 also illustrates that the prongs 54A can include at least one prong 54A' that varies in one or both of size and shape from the other prongs 54A. For example, the prong 54A' can have a circumferential dimension or width W1 in excess of the other prongs 54A. Correspondingly, the connection portion 50 can have one bayonet slot 50A having an opening with a circumferential dimension or width W2 in excess of the other bayonet slot openings. Thus, it may be guaranteed that exactly one mutual orientation can be obtained between the connection portions 50, 54 when secured together, as the oversized prong 54A' is only capable of being axially received by the one oversized bayonet slot opening in order to align all the prongs with the respective slots. Although shown in conjunction with the other features of FIG. 7, namely the reversal of the connection portions, it will be understood that the feature of non-uniform prongs to ensure exactly one assembly orientation represents a separate feature that may be employed in conjunction with selected features of any of the embodiments illustrated or described herein. By controlling the exact mutual orientation between the connection portions 50, 54, the orientation of the motorcycle accessory 44, 144 relative to the fuel tank 20 and the motorcycle 24 is limited to exactly one definite orientation.

Figure 8:
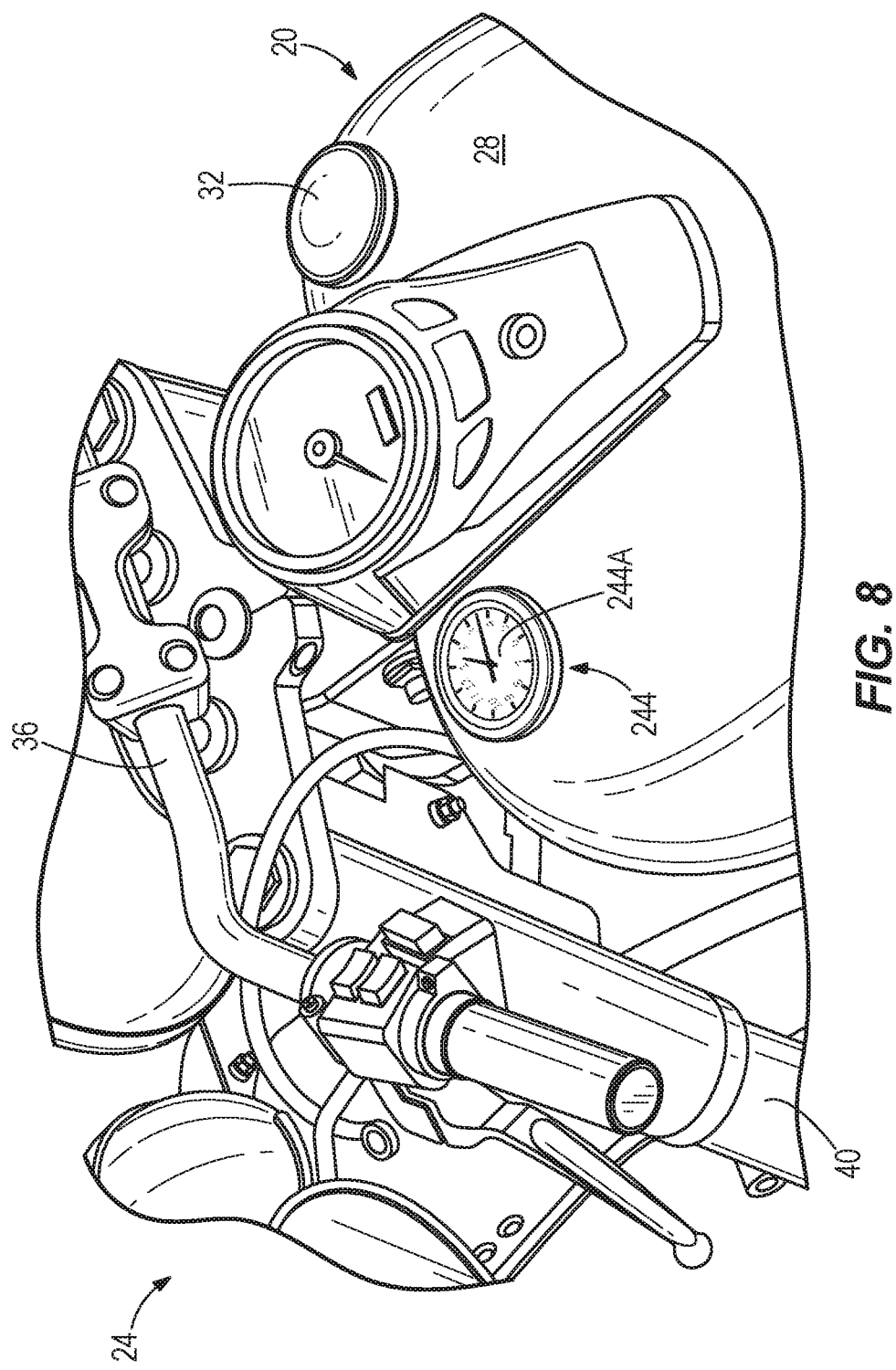
FIG. 8 is a perspective view of a motorcycle fuel tank assembly according to yet another construction, including a fuel tank-mounted accessory with a clock.

Turning back to the accessories 44, 144, it has been mentioned that the accessories 44, 144 can include a cover 46 with an outer end 44A, 144A that provides an exterior surface for viewing and/or handling. In some cases, the accessories 44, 144 may be decorative items that optionally match the appearance of the fuel cap 32, or provides another desired visual effect. However, the accessories 44, 144 can take a number of other forms, some of which are described further and illustrated herein. For example, an accessory having a connection structure according to the above description can be an electronic device that is battery powered or solar powered. The accessory can include a display. One such non-limiting example is shown in FIG. 8, in which the accessory 244 is a clock. An outer end 244A of the clock provides an exterior surface for viewing, and may optionally provide one or more user-operable controls (e.g., knobs, buttons, switches, etc.) that can be handled or manipulated by the hands of a human operator. Other non-limiting examples of electronic accessories that can feature the connection structure for fuel tank mounting as disclosed herein include a compass, a temperature gauge, a GPS unit, a camera, and a wireless speaker.

Another construction, illustrated in FIG. 9, illustrates another functional accessory that can be attachable to the motorcycle fuel tank 20 with the connection structure according to the above description. As shown in FIG. 9, the accessory 344 includes a storage compartment or "glove box". An outer end 344A of the storage compartment includes an access port such as a door, with an optional lock, that can be manipulated by the hands of a human operator to selectively access an interior of the storage compartment when opened. The storage compartment can also have a zippered closure or hook-and-loop strip closure, for example.

Although the invention has been described in detail with reference to certain preferred embodiments, variations and modifications exist within the scope and spirit of one or more independent aspects of the invention as described.

What is claimed is:

1. A fuel tank assembly for a motorcycle, the fuel tank assembly comprising:
   a fuel tank defining a fuel containment volume, the fuel tank having an upper wall;
   a fuel cap operable to selectively open and close the fuel containment volume; and
   a motorcycle accessory attachable to the fuel tank via a connection structure including first and second connection portions that are complementary and inter-engageable together to positively define a fully-secured state,
   wherein the first connection portion is secured to an exterior surface of the upper wall of the fuel tank, and the second connection portion is secured to the motorcycle accessory,
   wherein the connection structure defines a finite position and rotational orientation of the motorcycle accessory upon relative rotation of the motorcycle accessory with respect to the fuel tank to the fully-secured state, and
   wherein the motorcycle accessory includes a cover having an outer shape matching an outer shape of the fuel cap.

2. The fuel tank assembly of claim 1, wherein the fuel tank has an outer shape defining a symmetry plane, and wherein the fuel cap and the first connection portion are equally-spaced from the symmetry plane.

3. The fuel tank assembly of claim 1, wherein the fully-secured state is defined by a bayonet coupling.

4. The fuel tank assembly of claim 3, wherein the first connection portion is provided as a locking plate having a plurality of bayonet slots, and the second connection portion is provided as a plurality of locking tabs equal in number to the plurality of bayonet slots.

5. The fuel tank assembly of claim 1, wherein the motorcycle accessory is operable to achieve the fully-secured state by rotation of no more than 180 degrees.

6. The fuel tank assembly of claim 1, wherein the first connection portion is positioned within a localized depression formed in the upper wall.

7. The fuel tank assembly of claim 1, further comprising a resilient member operable to be compressed between the upper wall and the motorcycle accessory to provide a preload force when the motorcycle accessory is in the fully-secured state.

8. The fuel tank assembly of claim 1, wherein the motorcycle accessory is battery powered or solar powered.

9. The fuel tank assembly of claim 1, wherein the first connection portion is secured to an exterior surface of the upper wall of the fuel tank without screw threads, and wherein the first and second connection portions are engageable together to the fully-secured state without screw threads.

* * * * *